(12) United States Patent
Chabah et al.

(10) Patent No.: US 7,639,172 B2
(45) Date of Patent: Dec. 29, 2009

(54) METHOD FOR STORING MEASUREMENTS MADE BY A RADAR

(75) Inventors: Myriam Chabah, Brest (FR); Jean-Paul Artis, Plouzane (FR)

(73) Assignee: Thales (FR)

( * ) Notice: Subject to any disclaimer, the term of this patent is extended or adjusted under 35 U.S.C. 154(b) by 27 days.

(21) Appl. No.: 12/138,045

(22) Filed: Jun. 12, 2008

(65) Prior Publication Data

US 2008/0309549 A1 Dec. 18, 2008

(30) Foreign Application Priority Data

Jun. 15, 2007 (FR) ................................. 07 04283

(51) Int. Cl.
  *G01S 13/00* (2006.01)
  *G06K 9/36* (2006.01)
  *G06F 7/00* (2006.01)
(52) U.S. Cl. .................. 342/26 B; 342/26 R; 342/195; 382/166; 707/101
(58) Field of Classification Search .............. 342/26 R, 342/26 A, 26 B, 26 C, 26 D, 175, 195; 702/1–4; 382/162, 166; 707/100, 101
See application file for complete search history.

(56) References Cited

U.S. PATENT DOCUMENTS

| | | | |
|---|---|---|---|
| 5,202,690 A * | 4/1993 | Frederick .................. | 342/26 B |
| 5,583,972 A * | 12/1996 | Miller ........................ | 345/419 |
| 5,839,089 A * | 11/1998 | Yasuda et al. .................. | 702/3 |
| 5,907,568 A * | 5/1999 | Reitan, Jr. .................. | 342/26 B |
| 6,163,756 A * | 12/2000 | Baron et al. ................... | 702/3 |
| 6,240,369 B1 * | 5/2001 | Foust ............................ | 702/3 |
| 6,381,538 B1 * | 4/2002 | Robinson et al. ............ | 701/211 |
| 6,384,830 B2 * | 5/2002 | Baron et al. ................. | 345/473 |
| 6,496,780 B1 * | 12/2002 | Harris et al. ................... | 702/3 |

(Continued)

FOREIGN PATENT DOCUMENTS

| | | |
|---|---|---|
| EP | 0851240 | 7/1998 |
| GB | 2169165 | 7/1986 |
| JP | 11160452 | 6/1999 |
| WO | WO03003041 | 1/2003 |

*Primary Examiner*—Thomas H Tarcza
*Assistant Examiner*—Peter M Bythrow
(74) *Attorney, Agent, or Firm*—Lowe Hauptman Ham & Berner, LLP

(57) ABSTRACT

The present invention relates to a method for storing measurements of a given type made by a radar, each measurement having been made at a position in a given coordinate system. The method comprises a step of accessing a structured data storage space, each location of which is addressable by a pair of positive integers and each location of which is able to store at least one evolution profile of the measurements of the given type as a function of altitude. It also comprises a meshing step which associates a ground position with a pair of positive integers allowing a location to be addressed. The method also comprises a step of modifying the content of the location with the pair of integers as its address by storing there an evolution profile such that for each ground position sufficiently close to the position associated with the pair and for which a measurement has been made at a certain altitude, the evolution profile provides approximately the measurement made at this altitude.

12 Claims, 2 Drawing Sheets

Figure 1:
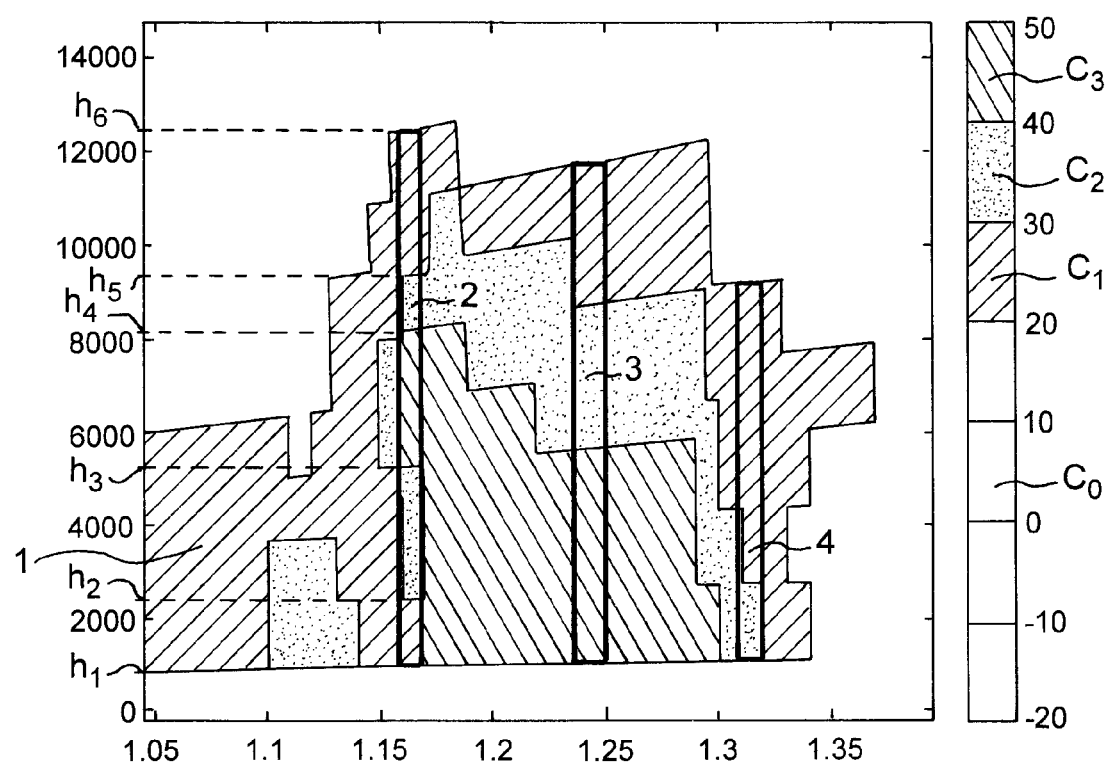

U.S. PATENT DOCUMENTS 6,563,452 B1 * 5/2003 Zheng et al. .............. 342/26 R
6,667,710 B2 * 12/2003 Cornell et al. ............ 342/26 R
6,670,908 B2 * 12/2003 Wilson et al. ............ 342/26 R
7,109,913 B1 * 9/2006 Paramore et al. .......... 342/26 B
7,471,995 B1 * 12/2008 Robinson ...................... 701/3
2003/0065445 A1 * 4/2003 White et al. ................... 702/2

* cited by examiner

METHOD FOR STORING MEASUREMENTS MADE BY A RADAR

RELATED APPLICATIONS

The present application is based on, and claims priority from, French Application Number 0704283, filed Jun. 15, 2007, the disclosure of which is hereby incorporated by reference herein in its entirety.

FIELD OF THE INVENTION

The present invention relates to a method for storing measurements of a given type made by a radar. It applies, for example, in the field of weather radars.

BACKGROUND OF THE INVENTION

A weather radar allows location of precipitations such as rain, snow or hail, measurement of their intensity and possibly identification of dangerous phenomena. Most weather radar are installed on the ground and are often part of a larger weather surveillance network. But airborne applications are increasingly coming into being, air transport being particularly interested in meteorological phenomena. The concern is notably with bypassing cumulonimbi, enormous clouds much feared by pilots as they sometimes create violent storms. Even airliners change their route in order to avoid crossing the path of certain particularly threatening cumulonimbi. This is because the lightning, the hail and the strong wind shears inside the cloud add to the risk of ice accretion and may endanger the flight if the pilot attempts to pass through.

A weather radar allows the detection of extended voluminous targets that clouds are, of which it must provide the position, size and dangerousness. To do that, a weather radar may, for example, emit a wave in the X-band. The distance to a cloud is deduced from the time necessary for the emitted pulse to carry out a return trip from the radar antenna to the cloud at the speed of light. This time corresponds simply to the time between emitting a pulse and receiving its echo. Estimation of the size of a cloud entails estimating its extent, i.e. the maximum horizontal distance it extends over, and estimating its elevation, i.e. the maximum vertical distance it extends over. Estimation of the extent profits notably from the azimuth scan of the radar beam. Estimation of the elevation profits notably from the elevation scan of the radar beam. By way of an indication, the elevation of a cumulonimbus often exceeds 10000 meters! It is the elevation which primarily characterizes the dangerousness of the cloud, for the higher a convective cloud is, the more dangerous it is. But the danger level of the cloud is also linked with its reflectivity factor, designated Z, which characterizes the concentration of hydrometeors suspended in a volume of air, in liquid or solid form. In a way, the reflectivity factor Z represents the intensity of the cloud. Once in a logarithmic scale, it is represented in dBZ.

In concrete terms, a display console displays to the onboard crew a simplified representation of clouds based on elementary geometrical shapes such as parallelepipeds, the color of which characterizes the intensity, whether it involves rain, snow or hail. For example, the color black is often used for dry air, i.e. the absence of cloud. Green and yellow may be used for moderate humidity concentrations. Red is often used for areas with very high humidity concentration, i.e. the most dangerous areas which it is absolutely necessary to bypass. The display must be almost instantaneous, possibly on several screens used by various crew members throughout the flight. This simplified graphical representation of clouds is constructed on the screen using previously made intensity measurements, these measurements being stored for a greater or lesser period in a suitable memory space. Access to the data must therefore be fast and efficient, which is not without difficulties when the large quantity of data to be stored and therefore the memory space to be addressed is considered. In fact, it involves still making an intensity value available for every position (x, y, z) of space within range of the radar! The data must therefore be stored in a structured manner in order to optimize access to them while avoiding notably accessing them sequentially. This is one of the technical problems to which the present invention proposes to provide an innovative solution.

One current solution consists in saving the intensity information in a 3D matrix with each dimension corresponding to a spatial dimension. Hence, a triplet of indices (i, j, k) corresponds to each position (x, y, z), the coefficient of the 3D matrix at the location (i, j, k) containing an intensity value associated with the position (x, y, z). But such a solution is costly in terms of memory space: whatever the quantity of relevant information saved, the purely spatial quantification in a matrix makes it necessary to reserve a large memory space. For the matrix may possibly be largely filled with zero or insignificant values over an entire area. Thus, the memory is needlessly burdened, notably by clear weather, which is particularly damaging in airborne systems, the resources of which are limited. Of course, the problem is accentuated when the display precision increases, i.e. when the surface covered by a coefficient (i, j, k) of the 3D matrix decreases while the weather area to be stored remains the same.

SUMMARY OF THE INVENTION

The aim of the invention is notably to propose an advantageous compromise between the memory space used and the spatial precision permitted, and to avoid storing too many zero or insignificant values. For a given 2D geographical ground area, it involves notably not storing all the intensity values measured for all the altitude levels, but instead storing a parametric representation of these values. To this end, it is functions that are stored, each function representing the evolution of the intensity as a function of the altitude at a considered point on the ground.

To this end, the subject of the invention is a method for storing measurements of a given type made by a radar, each measurement having been made at a position in a given coordinate system. The method comprises a step of accessing a structured data storage space, each location of which is addressable by a pair of positive integers and each location of which is able to store at least one evolution profile of the measurements of the given type as a function of the altitude. It also comprises a meshing step which associates a ground position with a pair of positive integers allowing a location to be addressed. It also comprises a step of modifying the content of the location with the pair of integers as its address by storing there an evolution profile such that for each ground position sufficiently close to the position associated with the pair and for which a measurement has been made at a certain altitude, the evolution profile provides approximately the measurement made at this altitude.

In one embodiment, several evolution profiles may be stored at the location with the pair as its address. It is possible that a single one of said profiles may be nonzero for a given altitude.

Advantageously, the profile may be stored in the form of a structure containing a p-tuple of values, p being a positive nonzero integer. The evolution profile may thus be a piecewise constant function assuming p distinct nonzero values, or a polynomial function of degree p−1 or again a spatial distribution defined by p−2 real coefficients, a mean and a standard deviation. It may also be linear by segment.

For example, the measurements may be values characterizing the reflectivity of clouds or their danger level made by an airborne weather radar.

A principal advantage of the invention is also that it enables space to no longer be wasted for storing useless values, such as the values corresponding to areas without cloud or without a weather danger.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

DETAILED DESCRIPTION OF THE DRAWINGS

Figure 2:
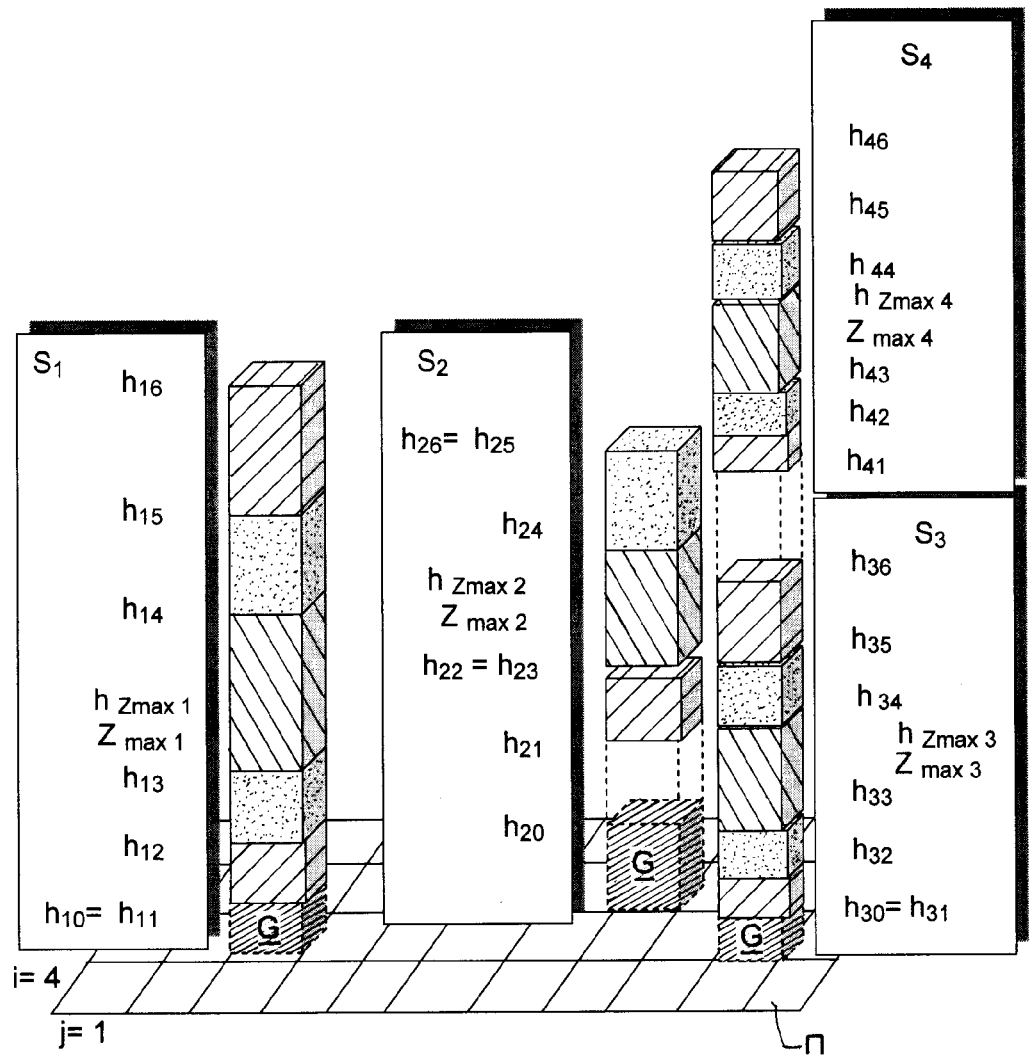

The present invention is illustrated by way of example, and not by limitation, in the figures of the accompanying drawings, wherein elements having the same reference numeral designations represent like elements throughout and wherein:

FIG. 1, an illustration through a view of a screen on board an aircraft of an example where the parametric functions are simple piecewise constant functions; and FIG. 2, an illustration through a diagram of an example of enriched structures to store the parametric functions.

DETAILED DESCRIPTION OF THE INVENTION

The method according to the present invention proposes storing the measurements made by a radar, such as the reflectivity of clouds or their danger level in the case of a weather radar, in a way enabling the quantity of information saved to be significantly limited. Advantageously, the method may be simply implemented in the majority of computer systems for processing radar signals, whether or not they are airborne, and this without modification of their hardware or software configuration. To do this, a section of random access memory (RAM) is structured in a two-dimensional array, each cell of the array being accessible through a pair of positive integer indices (i,j). The array forms a 2D ground mesh, that is to say that a ground position $(x_i, y_j, 0)$ in a given coordinate system, $x_i$ and $y_j$ being real numbers, corresponds to each cell with indices (i,j). In addition, each cell with indices (i,j) contains a complex data item enabling deduction of the reflectivity of clouds or their danger level at the vertical of the position $(x_i, y_j, 0)$ as a function of the altitude z. In other words, the complex data item stored in the cell (i,j) enables deduction of the reflectivity of clouds, their danger level, or any other quantity in any position $(x_i, y_j, z)$. For example, the complex data item may be a record $E_{ij} = \{S_1, S_2, \ldots, S_N\}$ of N structures $S_k$, N being a positive nonzero integer and k an integer between 1 and N, each structure $S_k$ enabling description of a parametric function f which associates a cloud reflectivity, a danger level or any other quantity with a height h. As illustrated by the three following examples, the type of parametric function f may vary without departing from the principles of the present invention: f may be a piecewise constant function, a polynomial function or again a spatial distribution. The invention thus requires storing in each cell of the array with indices (i,j) at least one structure representing a parametric function $f$ such that, for any position (x, y, 0) sufficiently close to $(x_i, y_j, 0)$ below a certain threshold and for which a measurement M(x, y, z) has been made at an altitude z, the measurement M(x, y, z) is sufficiently close to $f(z)$ below a certain threshold in the sense of a norm suited to the measurement type. Advantageously, several structures representing several parametric functions may be stored in a cell with indices (i,j). In this case, advantageously but not exclusively, a single one of the stored parametric functions is nonzero in z for a given altitude z. In another embodiment, f may be a linear segment function.

FIG. 1 illustrates through a view of a screen on board an aircraft a first example where the parametric functions are simple piecewise constant functions. FIG. 1 shows how the invention may, for example, allow the reflectivity of clouds or their danger level to be displayed simply by a color code, the measurements having been made by an airborne radar. The screen displays a typical cloud 1 represented in vertical section in a graph, the x-axis indicating the distance relative to the radar and the y-axis indicating the altitude in feet relative to the ground. On the right of the graph, the screen also displays a color palette allowing each reflectivity level to be linked with a color. For example a reflectivity level less than 20 dBZ is displayed in a color $c_0$, for example black. A level between 20 dBZ and 30 dBZ is displayed in a color $c_1$, for example green. A level between 30 dBZ and 40 dBZ is displayed in a color $c_2$, for example yellow. Finally, a level higher than 40 dBZ is displayed in a color $c_3$, for example red. Typically, in terms of mean reflectivity value and for gaps between colors of around 10 dB, a cloud is characterized by a succession of intensity measurements that grow going toward the center of the cloud, then decrease when moving away from the center of the cloud. In the illustration of the cloud 1 this typical phenomenon is brought out by the column structures 2, 3 and 4 corresponding respectively to distances of around 1.15, 1.25 and 1.3 relative to the radar. In column 2, there is hence a transition from black to green at an altitude $h_1$ of around 1000 feet, from green to yellow at an altitude $h_2$ of around 2500 feet, from yellow to red at an altitude $h_3$ of around 5000 feet, from red to yellow at an altitude $h_4$ of around 8000 feet, from yellow to green at an altitude $h_5$ of around 9000 feet, and finally from green to black at an altitude $h_6$ of around 12000 feet. A structure S enabling representation of column 2 may be defined by a record of 6 heights $S = \{h_1, h_2, \ldots h_6\}$ in which each height respectively corresponds to a height of a color change: $h_1$ for the transition from black to green, $h_2$ for the transition from green to yellow, $h_3$ for the transition from yellow to red, $h_4$ for the transition from red to yellow, $h_5$ for the transition from yellow to green, $h_6$ for the transition from green to black. It seems that by postulating that the measurement of the intensity of a cloud is graduated, it is possible to limit the quantity of saved information. Thus a very small number of parameters, such as the six parameters of the present example, can enable the display of a reflectivity level without error in quantifying the information. Notably, the use of information about the graduation of the measurement of intensity of a cloud limits a priori the quantity of saved information.

More generally, each parametric function f may be defined by a piecewise constant function in the form of a p-tuple of heights $\{h_1, h_2, \ldots h_p\}$, where p is a nonzero integer, such that:

$$f(h): \begin{cases} h_1 > h \Longleftrightarrow f(h) = z_0 \\ h_1 < h < h_2 \Longleftrightarrow f(h) = z_1 \\ \cdots \\ h_{p-1} < h < h_p \Longleftrightarrow f(h) = z_p \\ h > h_p \Longleftrightarrow f(h) = z_0 \end{cases}$$

where the values $\{z_0, z_1, \ldots z_p\}$ are mean reflectivity values corresponding respectively to the colors $\{c_0, c_1, \ldots c_p\}$ fixed for all the structures $S_k$. In this case, a structure $S_k$ is defined by a record $\{h_1, h_2, \ldots h_p\}$. Thus from $h_1$ to $h_2$ a color $c_1$ is displayed, from $h_2$ to $h_3$ a color $c_2$ is displayed, and so on through to $h_{p-1}$ to $h_p$ where the color $c_{p-1}$ is displayed. For the heights above $h_p$ or below $h_1$, the color $c_0$ is displayed. In another embodiment, a continuous linear segment parametric function may be defined in a similar manner by a p-tuple of heights $\{h_1, h_2, \ldots h_p\}$ defining the points at which the slope of the function changes.

FIG. 2 illustrates through a diagram an example of structures enriched in relation to the structure S of the example in FIG. 1. The structures are represented over a two-dimensional matrix Π which stores them. The matrix Π comprises 4 rows indexed from i=1 to i=4 and 11 columns indexed from j=1 to j=11. In the interests of clarity, only the index of the row i=4 and the index of the column j=1 have been represented. For example, in a structure $S_1$ stored in the cell with the indices i=3 and j=3 and defined by a record $\{h_{10}, h_{11}, h_{12}, h_{13}, h_{14}, h_{15}, h_{16}\}$, the cloud 1 touches the ground G at a height $h_{10}$, the height $h_{10}$ providing the altitude of the ground and $h_{10}$ being equal to a height $h_{11}$ providing the base of the cloud 1. In the structure $S_1$, the intensity measurement reaches a maximum value $Z_{max1}$ at an altitude $h_{Zmax1}$. As another example, in a structure $S_2$ stored in the cell with the indices i=2 and j=8, defined by the record $\{h_{20}, h_{21}, h_{22}, h_{23}, h_{24}, h_{25}, h_{26}\}$, the color yellow does not appear between the green and the red, which is marked by the fact that the height $h_{22}$ is equal to the height $h_{23}$. Similarly, green does not appear above the yellow, which is marked by the fact that the height $h_{26}$ is equal to the height $h_{25}$. In the structure $S_2$, the intensity measurement reaches a maximum value $Z_{max2}$ at an altitude $h_{Zmax2}$. As another example, a structure $S_3$ stored in the cell with the indices i=3 and j=10, defined by the record $\{h_{30}, h_{31}, h_{32}, h_{33}, h_{34}, h_{35}, h_{36}\}$, and a structure $S_4$ also stored in the cell with the indices i=3 and j=10, defined by the record $\{h_{41}, h_{42}, h_{43}, h_{44}, h_{45}, h_{46}\}$, both correspond to the same position on the ground. This is marked by the absence of a height $h_{40}$ in $S_4$ to represent the altitude of the ground. In the structure $S_3$, the intensity measurement reaches a maximum value $Z_{max3}$ at an altitude $h_{Zmax3}$. In the structure $S_4$, the intensity measurement reaches a maximum value $Z_{max4}$ at an altitude $h_{Zmax4}$.

The function f may also be a polynomial function defined by a p-tuple $(a_0, a_1, \ldots, a_{p-1})$ of coefficients:

$$f(h) = a_0 + a_1 h + a_2 h^2 + \ldots + a_{p-1} h^{p-1}$$

In this case, a structure $S_k$ is defined by the record $(a_0, a_1, \ldots, a_{p-1})$.

The parametric function f may also be a spatial distribution around a pixel $(x_0, y_0)$:

$$f_{x_0 y_0}(h) = \sum_{i=0}^{p-1} k_i \exp\left[-\frac{(h - m_h)^2}{\sigma_h^2}\right]$$

In this case, a structure $S_k$ is defined by a record $\{k_0, k_1, \ldots, k_{p-1}, m_h, \sigma_h\}$ where $k_0, k_1, \ldots, k_{p-1}$ are real coefficients, $m_h$ is the mean of the heights at which measurements have been made on the vertical of $(x_0, y_0)$ and $\sigma_h$ is the standard deviation of the heights at which measurements have been made on the vertical of $(x_0, y_0)$.

It must be noted that the previously described invention is not applicable only to the measurement of the intensity or reflectivity of a cloud. Without departing from the principles of the invention it is also applicable to any measured or calculated quantity likely to vary as a function of altitude, such as, for example, the risk level, the standard deviation in speed or again the integral scale. Moreover, the previously described invention enables the rapid increase in calculation power in relation to the available memory space to be profited from fully, especially in airborne systems. This is because the parametric representation of the reflectivity level according to the invention allows the relevant information to be compressed and hence to save memory space. Notably, the use of information about the graduation of the measurement of intensity of a cloud limits a priori the quantity of saved information. Hence, the transfer rate necessary to transfer information characterizing a weather situation is considerably reduced. The disappearance of quantifying information in terms of altitude simplifies the display in a panoramic view at a constant angle of elevation, the type of display better known by the acronym PPI meaning "Plan Position Indicator". The parametric nature of the representation according to the invention also allows calculations of the vertical tendency to be made more easily and more precisely.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

We claim:

1. A method for storing measurements of a given type made by a radar, each measurement M(x, y, z) having been made at a position (x, y, z) in a given coordinate system, where x, y and z are real numbers, the method comprising:
   a step of accessing a structured data storage space (Π), each location of which is addressable by a pair of positive integers and each location of which is able to store at least one evolution profile of the measurements of the given type as a function of the altitude z;
   a meshing step which associates a position $(x_i, y_j, 0)$, where $x_i$ and $y_j$ are real numbers, with a pair of positive integers (i,j) allowing a location to be addressed;
   a step of modifying the content of the location with the pair (i,j) as its address by storing there an evolution profile $f_{ij}$ such that for each pair (x,y) of real numbers satisfying $|x - x_i| \leq \epsilon_x$ and $|y - y_j| \leq \epsilon_y$, where $\epsilon_x$ and $\epsilon_y$ are given real thresholds, for which a measurement M(x, y, z) has been made at an altitude z, $\|M(x, y, z) - f_{ij}\| \leq \epsilon_M$ where $\epsilon_M$ is a given real threshold and $\| \|$ is a norm suited to the type of the measurements.

2. The method as claimed in claim 1, wherein several evolution profiles are stored at the location with (i,j) as its address.

3. The method as claimed in claim 2, wherein a single one of the profiles is nonzero for a given altitude z.

4. The method as claimed in claim 1, wherein the profile $f_{ij}$ is stored at the location with (i,j) as its address in the form of a structure $(S_1, \ldots, S_n)$ where n is a positive nonzero integer, $S_k$ containing a p-tuple of values for each integer k between 1 and n, p being a positive nonzero integer.

5. The storage method as claimed in claim 4, wherein the evolution profile $f_{ij}$ is a piecewise constant function.

6. The storage method as claimed in claim 4, wherein the evolution profile $f_{ij}$ is a linear segment function.

7. The storage method as claimed in claim 4, wherein the evolution profile $f_{ij}$ is a polynomial function of degree p−1.

8. The storage method as claimed in claim 4, wherein the evolution profile $f_{ij}$ is a spatial distribution defined by p−2 real coefficients, a mean and a standard deviation.

9. The storage method as claimed in claim 1, wherein the measurements are made by a weather radar.

10. The storage method as claimed in claim 9, wherein the measurements are values characterizing the reflectivity of clouds or their danger level.

11. The storage method as claimed in claim 9, wherein the weather radar is airborne.

12. The storage method as claimed in claim 10, wherein the weather radar is airborne.

* * * * *